(12) United States Patent
Fugel et al.

(10) Patent No.: US 6,241,172 B1
(45) Date of Patent: Jun. 5, 2001

(54) BELT RETRACTOR WITH ADJUSTABLE FORCE-LIMITING DEVICE

(75) Inventors: Frank Fugel, Halstenbek; Günter Clute, Henstedt-Ulzburg, both of (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/214,163

(22) PCT Filed: Jun. 23, 1997

(86) PCT No.: PCT/EP97/03284

§ 371 Date: Feb. 3, 1999

§ 102(e) Date: Feb. 3, 1999

(87) PCT Pub. No.: WO97/49583

PCT Pub. Date: Dec. 31, 1997

(30) Foreign Application Priority Data

Jun. 26, 1996 (DE) ............................................. 196 25 541
May 15, 1997 (DE) ............................................. 197 20 473

(51) Int. Cl.[7] .................................................. B65H 75/48
(52) U.S. Cl. ........................ 242/379.1; 280/805; 280/806
(58) Field of Search .......................... 242/379.1; 280/805, 280/806

(56) References Cited

U.S. PATENT DOCUMENTS

| Re. 29,147 | * | 3/1977 | Fiala | ................................. 242/379.1 |
|---|---|---|---|---|
| 3,857,528 | * | 12/1974 | Fiala | ................................. 242/379.1 |
| 3,952,967 | * | 4/1976 | Barile et al. | ....................... 242/379.1 |
| 4,323,205 | * | 4/1982 | Tsuge et al. | ....................... 280/805 X |
| 5,558,295 | * | 9/1996 | Bauer | ................................. 242/379.1 |
| 5,611,498 | * | 3/1997 | Miller, III et al. | ................ 242/379.1 |
| 5,618,006 | * | 4/1997 | Sayles | ............................... 242/379.1 |
| 5,667,161 | * | 9/1997 | Mitzkus et al. | ................... 280/806 X |
| 5,799,893 | * | 9/1998 | Miller, III et al. | ................ 242/379.1 |
| 5,823,570 | * | 10/1998 | Lane, Jr. et al. | .............. 242/379.1 X |
| 5,967,441 | * | 10/1999 | Kohlndorfer et al. | ............ 242/379.1 |

* cited by examiner

*Primary Examiner*—Donald P. Walsh
*Assistant Examiner*—Minh-Chau Pham
(74) *Attorney, Agent, or Firm*—Robert W. Becker & Associates

(57) ABSTRACT

A self-locking belt retractor has a belt reeling shaft having a belt connected thereto. A locking device, activatable in a vehicle sensitive and/or belt-sensitive manner for preventing belt removal from the belt reeling shaft is provided. The locking device has a locking member and a profiled head connected to the belt reeling shaft. The belt reeling shaft is locked when the locking member engages the profiled head. At least two force-limiting elements are arranged in parallel or in series to one another, wherein one of the force-limiting elements is a torsion bar allowing a limited belt removal when the locking device locks the belt reeling shaft. A switching device for selectively engaging at least one of the force-limiting elements is provided to thereby connect the belt reeling shaft and the profiled head. The switching device is switched between the force-limiting elements and the belt reeling shaft for adjusting the energy absorption of the belt retractor and adapting the belt retractor to pre-adjustable incidents of loading.

20 Claims, 10 Drawing Sheets

BELT RETRACTOR WITH ADJUSTABLE FORCE-LIMITING DEVICE

BACKGROUND OF THE INVENTION

The invention relates to a self-locking belt retractor with a locking device that is activated in a vehicle-sensitive and/or belt-sensitive manner, whereby the belt retractor has as a force-limiting device a torsion bar that allows, when the locking member is engaged a limited belt removal and is connected, on the one hand, to the belt reeling shaft and, on the other hand, by a profiled head to the locking member of the belt retractor. A device for adjusting the energy absorption of the torsion bar and adjusting the torsion bar to preselected incidents of loading is switched in the force-transmitting path between the torsion bar and the belt reeling shaft.

A self-locking belt retractor with the aforementioned features is known from DE 27 27470 A1. Inasmuch as the known belt retractor has a torsion bar as a force-limiting device, for an individual adjustment of the force level of the belt force limitation to the respective parameters set by the passenger, a continuos change of the clamping length of the torsion bar as a function of the weight of the passenger seated in the vehicle seat and/or of the allowed forward movement path is realized. For this purpose, a sliding sleeve connected to the belt reeling shaft and adjustable over the length of the torsion bar is provided which can be moved by an actuating device and, depending on its position, determines the torsion force and thus the free torsion length of the torsion available for force limitation.

In theory, the clamping length does not affect the force level for the belt force limitation, instead only the energy absorption capacity of the torsion bar is changed. Practical experiments in this context have shown that the effect of the clamping length of the torsion bar onto the force level is minimal and is not sufficient for practical applications. The invention has therefore the object to improve a belt retractor of the aforementioned features such that a change of the force level is possible over a wide adjustment range and furthermore also possible directly at the beginning or during an accident as a function of the loading conditions occurring in individual situations.

SUMMARY OF THE INVENTION

The invention is based on the principal idea that at least two force-limiting elements, arranged in parallel or in series relative to one another and controllable by a switching device that adjusts the energy absorption are provided, whereby one of the force-limiting elements is embodied by the torsion bar.

The inventive other force-limiting element, according to one embodiment of the invention, is embodied as a torsion sleeve surrounding the torsion bar whereby the torsion bar and/or torsion sleeve are connectable by a coupling element to the belt reeling shaft.

For this purpose, in a first embodiment it may be provided that the belt reeling shaft radially engages the end of the torsion bar and the torsion sleeve, respectively, and that at the belt reeling shaft a respective coupling pawl for the torsion bar as well as the torsion sleeve is arranged as a coupling element. Alternatively, it may be provided that the coupling element is embodied as a follower disc positioned at the end of the belt reeling shaft opposite the profiled head in positive locking, axially slidable connection with the belt reeling shaft. In its coupling position the follower disc couples the torsion bar and the torsion sleeve with one another by follower pins penetrating correlated abutting flanges of the torsion bar and the torsion sleeve.

In a second embodiment of the invention the adjustment of the force level is achieved in that as the other force-limiting element at least one resistance body is connected to the end of the belt reeling shaft opposite the profiled head. It revolves in a housing filled with a suitable material and is position-adjustable relative to the torsion bar.

In an alternative embodiment of the invention it may be provided that as the other force-limiting element the end of the belt reeling shaft opposite the profiled head is provided with a paddle wheel circulating in a housing filled with a suitable material whereby in the housing a friction plate is arranged so as to be axially moveable for adjustment of the material density.

Finally, in another embodiment of the invention, it is suggested that as a device for controlling the energy absorption capacity of the force-limiting device the torsion bar has at least two portions over its length separated by a connecting piece and having different cross-sections and that the portions of the torsion bar can be connected respectively to the belt reeling shaft by a coupling element between the belt reeling shaft and the respective connecting piece. In this context, the respective torsion bar can be embodied of two but also of three serially and formed-lockingly arranged or connected torsion bars.

With respect to the embodiment, respectively, arrangement of the coupling element, according to one embodiment of the invention it may be provided that either the end of the torsion bar is connected to the belt reeling shaft and the connecting piece separating the portions of the torsion bar are connectable by a controllable coupling pawl, supported at the belt reeling shaft, to the belt reeling shaft, or that alternatively at the end of the torsion bar a further connecting piece is arranged and as a coupling element a slide is provided that is fixedly coupled with respect to rotation to the belt reeling shaft, but axially moveably arranged thereat, and form-lockingly engages the connecting pieces. In this manner, it is possible to respectively couple the portions of different cross-sections of the torsion bar directly to the belt reeling shaft.

In more detail, according to one embodiment of the invention, it may be provided that at the connecting piece a sleeve surrounding the torsion bar may engage in a positive-locking manuever and the coupling pawl may be designed for fixation at the sleeve, whereby in an expedient manner the coupling pawl can be actuated by a pyrotechnical ignition pill arranged within the cross-section of the belt reeling shaft.

In another embodiment of the invention a multi-step adjustment of the torsion bar is provided instead of the two-step adjustment of the force limitation, and in this context it is suggested that, for adjusting a three-step energy absorption of the torsion bar, three portions separated by two connecting pieces are provided with different stepped cross-sections and each connecting piece has coordinated therewith a separate sleeve with coordinated coupling pawl.

Inasmuch as the connection between torsion bar and belt reeling shaft in individual cases is achieved by a sliding sleeve, it may be provided that as a coupling element a sliding sleeve is provided that is fixedly coupled with respect to rotation to the belt reeling shaft, but axially moveably arranged thereat, and engages the connecting pieces in a positive-locking manner.

In such an embodiment of the invention it may also be provided that the sliding sleeve is displaceable by a pyrotechnical ignition pill arranged within the cross-section of the belt reeling shaft. In this embodiment the gases released by the ignition pill will enter directly into the area of the sliding sleeve and will load it with respect to an axial movement.

As an alternative drive for the movement of the sliding sleeve it may be provided that for actuation of the sliding sleeve a pressure chamber is provided at the corresponding end face of the belt reeling shaft. A sliding disc is moveably arranged therein and the sliding disc is connected by a pawl engaging the disc and an attached pusher rod to the sliding sleeve and that the pressure chamber has an externally arranged ignition pill for releasing a pressure gas.

In this embodiment a three-step adjustment of the energy absorption is also provided since, for adjusting one of the three steps of the energy absorption level, the torsion bar has three portions separated by two connecting pieces with different stepped cross-section and the sliding sleeve is movable between the two connecting pieces and can be coupled by the movement selectively to each connecting piece. Two ignition pills acting respectively on the two sides of the sliding disk are connected to the pressure chamber.

As a further control of the force limitation it may be provided that for switching off the torsion bar the belt reeling shaft is lockable to a pressure ring rotatably supported the housing of the belt reeling shaft, whereby the pressure ring can be secured in a full load position by a pawl activated by a pyrotechnical ignition pill.

It may be expedient, after completion of the force limitation with rotation of the torsion bar, to prevent a further rotation of the belt reeling shaft in the removal direction in order to prevent overload of the torsion bar, it may be provided that the rotatably supported pressure ring has coordinated therewith a further stop pawl which is pivotable by the pressure ring that rotates with switched-on torsion bar into a stop position in which the stop pawl, upon continuing rotation of the pressure ring, provides a fixed stop for the pressure ring.

BRIEF DESCRIPTION OF THE DRAWINGS

In the drawing embodiments of the invention are disclosed which will be described in the following. It is shown in:

FIG. 1*a* the coupling area of the device for adjusting the force level according to FIG. 1 in an enlarged representation;

FIG. 3*a* the device for adjusting the force level in an enlarged representation;

DESCRIPTION OF PREFERRED EMBODIMENTS

Figure 1:
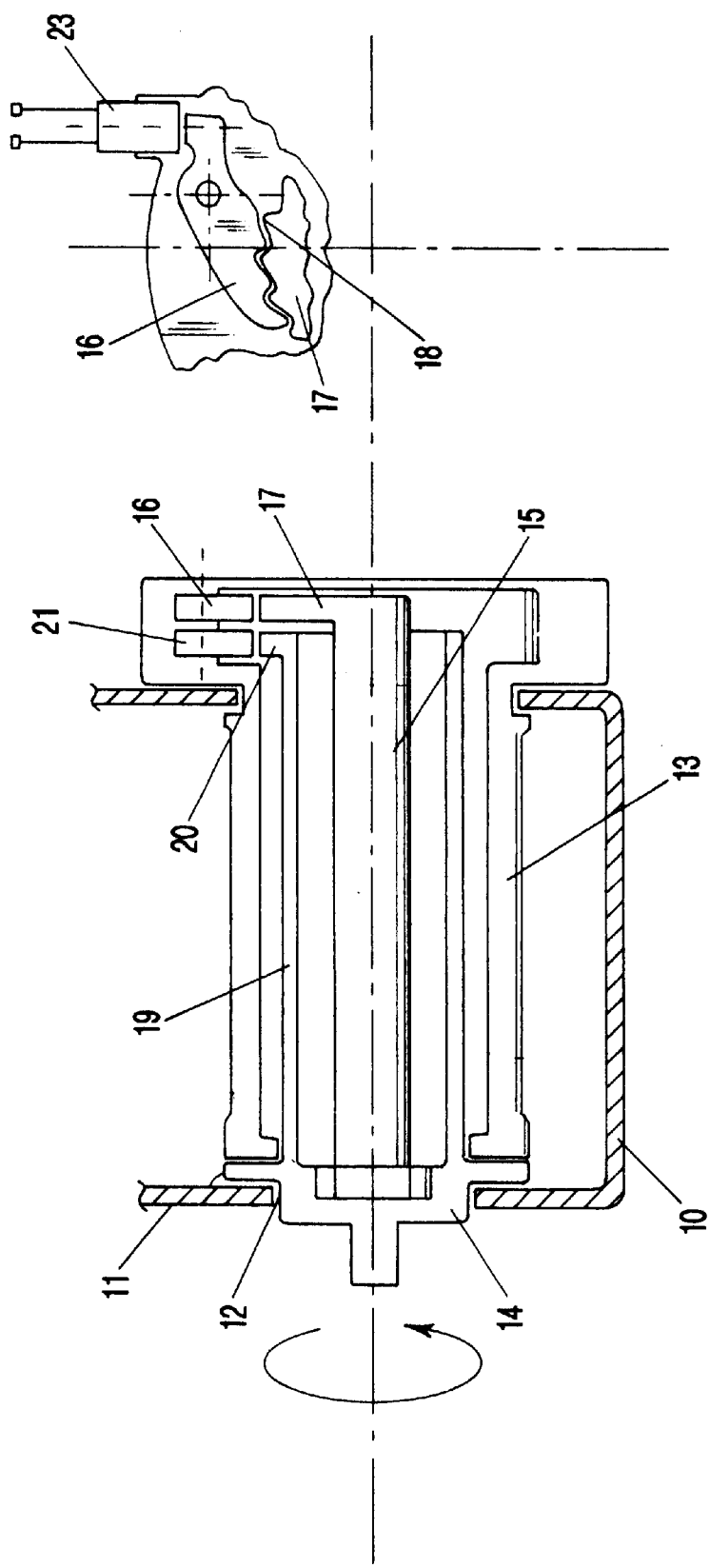
FIG. 1 a self-locking belt retractor with force limiting device in a schematic sectional representation.

The belt retractor respectively represented in the individual drawing figures is comprised of a U-shaped housing 10 having a belt reeling shaft 13 supported in the respective legs 11 of the U-shape, respectively, in the penetrations 12 arranged therein. At the locking end of the belt reeling shaft 13 a profiled head 14 is arranged at the shaft end face and revolves in the leg 11 of the U-shaped housing 10 whereby at the profiled head 14 a locking member (not represented) is supported that is radially deflectable under the effect of a non-represented control device. Due to the activation in the case of a deceleration, the locking member can be moved into a correlated toothing arranged in the penetration 12.

The profiled head 14 and the belt reeling shaft 13 are connected to one another by a torsion bar 15 acting as a force-limiting device. One end of the torsion bar 15 is preferably positive-lockingly connected to the profiled head 14 and the other end of the torsion bar 15 extending within the belt reeling shaft 13 is connected to the belt reeling shaft 13. For this purpose, the end opposite the profiled head 14 of the belt reeling shaft 13 engages the projecting end in the form of a radially projecting flange 17, whereby the flange 17 is provided with an outer toothing 18 as can be seen in FIG. 1*a*. At the end of the belt reeling shaft 13 a first coupling pawl 16 is supported which, upon engagement of the outer toothing 18, couples the torsion bar 15 and the belt reeling shaft 13 to one another.

As an additional force limiting element a torsion sleeve 19 is provided that surrounds the torsion bar 15 and is also connected to the profiled head 14. The torsion sleeve has a radial flange 20 adjacent to the flange 17 of the torsion bar 15 which is also provided with an outer toothing 18 whereby a second coupling pawl 21 is arranged at the belt reeling shaft 13. The coupling pawls 16, 21 can be selectively activated by a control device 23 which in the shown embodiment is a solenoid. As a function of the determined parameters such as seat position, height and weight of the passenger, the vehicle velocity or the inflation behavior of the air bags, it is possible to switch on only the torsion bar 15 or only the torsion sleeve 19 or torsion bar 15 and torsion sleeve 19 together by activating the respectively correlated coupling pawl(s) 16, 21 into the force transmitting path between the profiled head 14 supporting the locking member and the belt reeling shaft 13 so that in this manner a different force level can be selected.

Figure 2:
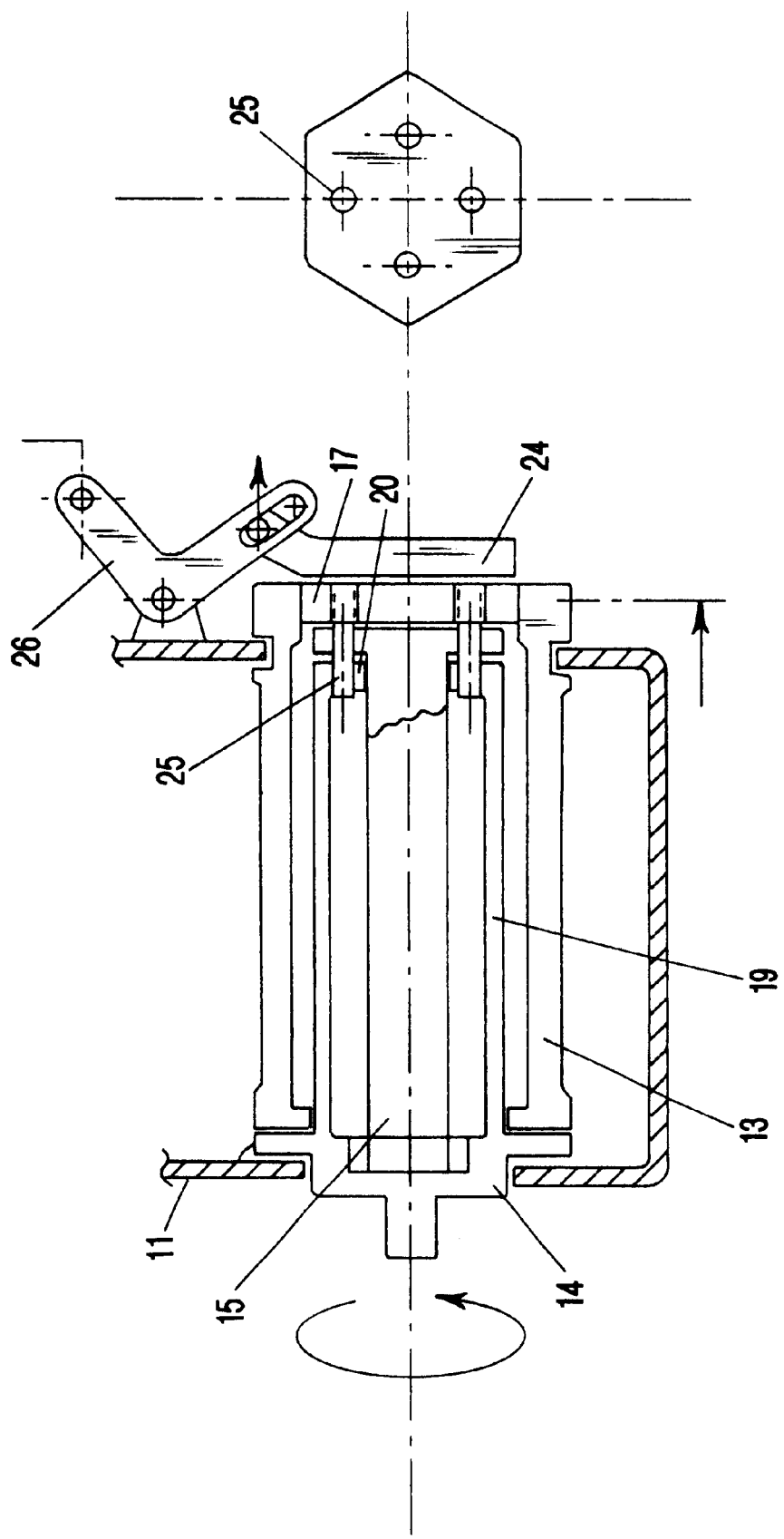
FIG. 2 the object of FIG. 1 in a further embodiment.

In the embodiment represented in FIG. 2 the radially active coupling between the torsion bar 15, respectively, the torsion sleeve 19 and the belt reeling shaft 13 is replaced by an axially movable and positive-lockingly connectable follower disk 24 connected to the belt reeling shaft 13 which axially penetrates the correlated flanges 17, 20 of torsion bar 15, respectively, torsion sleeve 19 with follower pins 25. For axial movement of the follower disk 24 an angled lever as control lever 26 is provided whose movement results in a movement of the follower disk 24. Depending on the position of the follower disk 24 only the torsion bar 15 or, in a parallel switching position, also the torsion sleeve 19 is connected to the belt reeling shaft 13.

Figure 3:
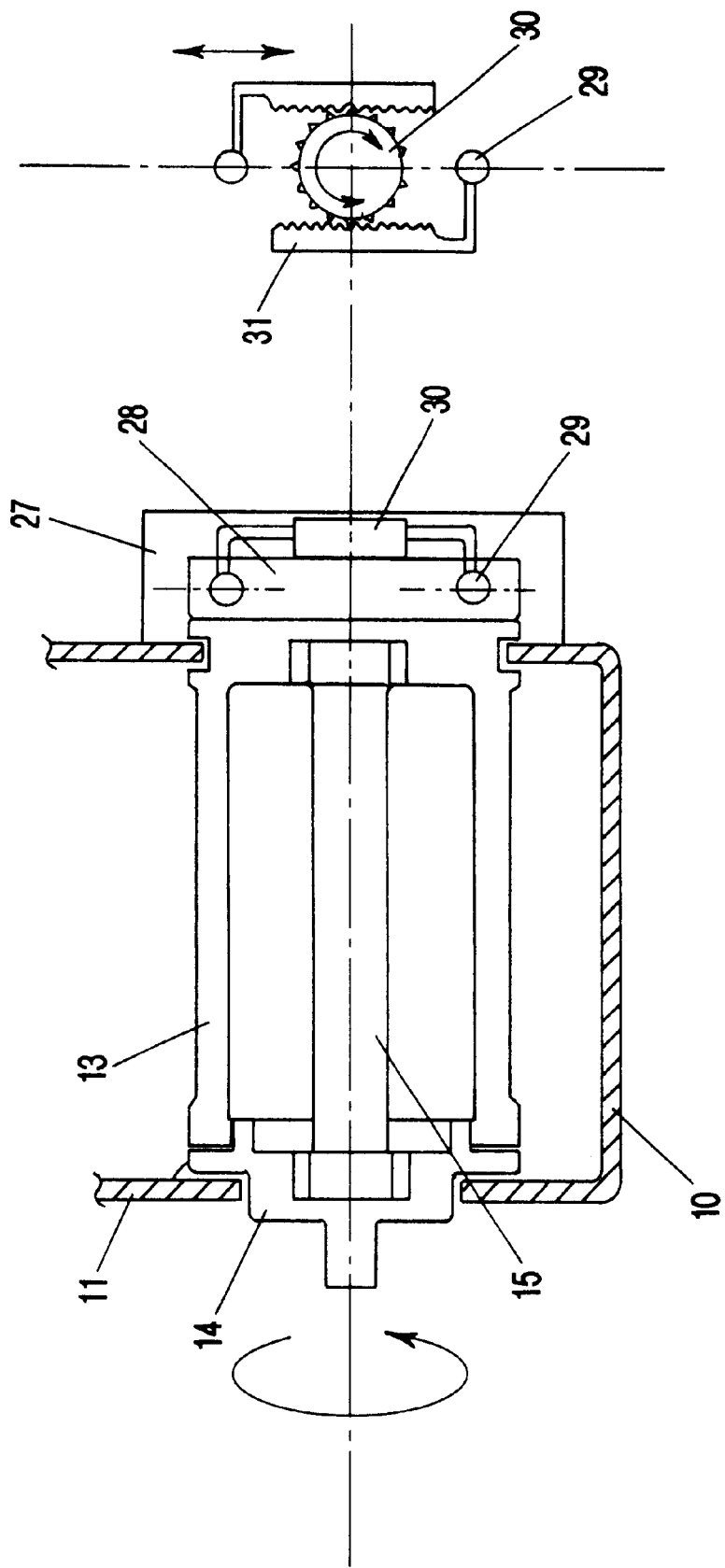
FIG. 3 the belt retractor with force limiting device in a further embodiment according to the representation of FIG. 1.

According to the embodiment represented in FIGS. 3, 3a, the side of the housing 10 of the belt retractor opposite the profiled head 14 is connected to a housing 27 filled with a gel filling 28 whereby the end of the belt reeling shaft 13 extending into the housing 27 supports two oppositely arranged resistance bodies 29 that are radially adjustable by a control device 30 in their position relative to the torsion bar 15. The control of the force limitation is provided by the displacement resistance which results from the resistance bodies 29 being forced through the gel filing 28 during the rotational movement between the profiled head 14 and the belt reeling shaft 13. An adjustment of the force level is to be provided by the radial position of the resistance bodies 29 for which purpose the control device 30 is comprised of a coupling to the housing 27 and a gear wheel 30 and toothed rods 31 coupled thereto as a support of the resistance bodies 29. This braking device must be turned off in normal operation and must be switched on in an accident situation.

Figure 4:
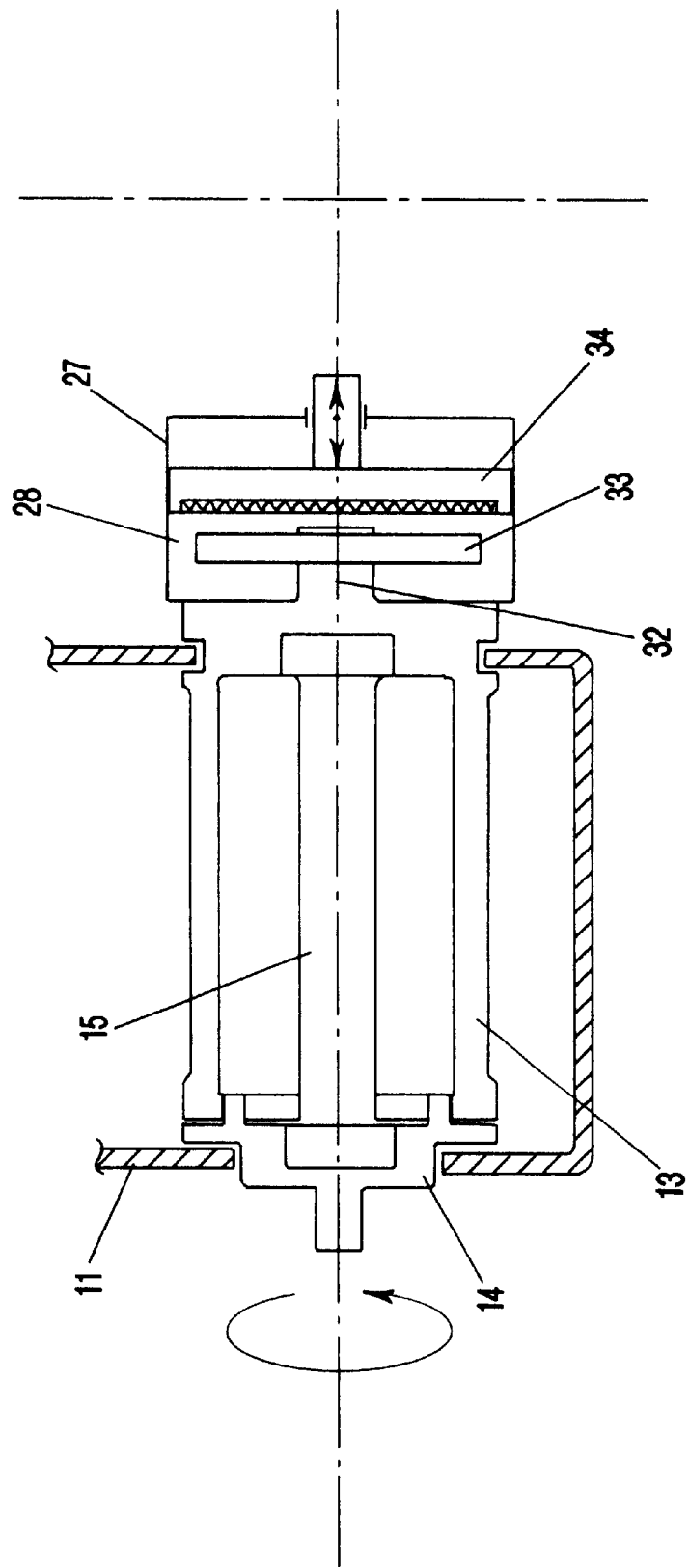
FIG. 4 the object of FIG. 3 in another embodiment.

In the corresponding embodiment represented in FIG. 4, the end of the belt reeling shaft 13 with its projection 32 extends into the housing 27 provided with a gel filling 28 whereby on the projection 32 a paddle wheel 33 is provided via which the force level can be adjusted. The control of the force level is realized individually by an axially movable pressure plate 34 in the housing 27 whereby its position in the housing determines the density of the gel filling 28.

Figure 5:
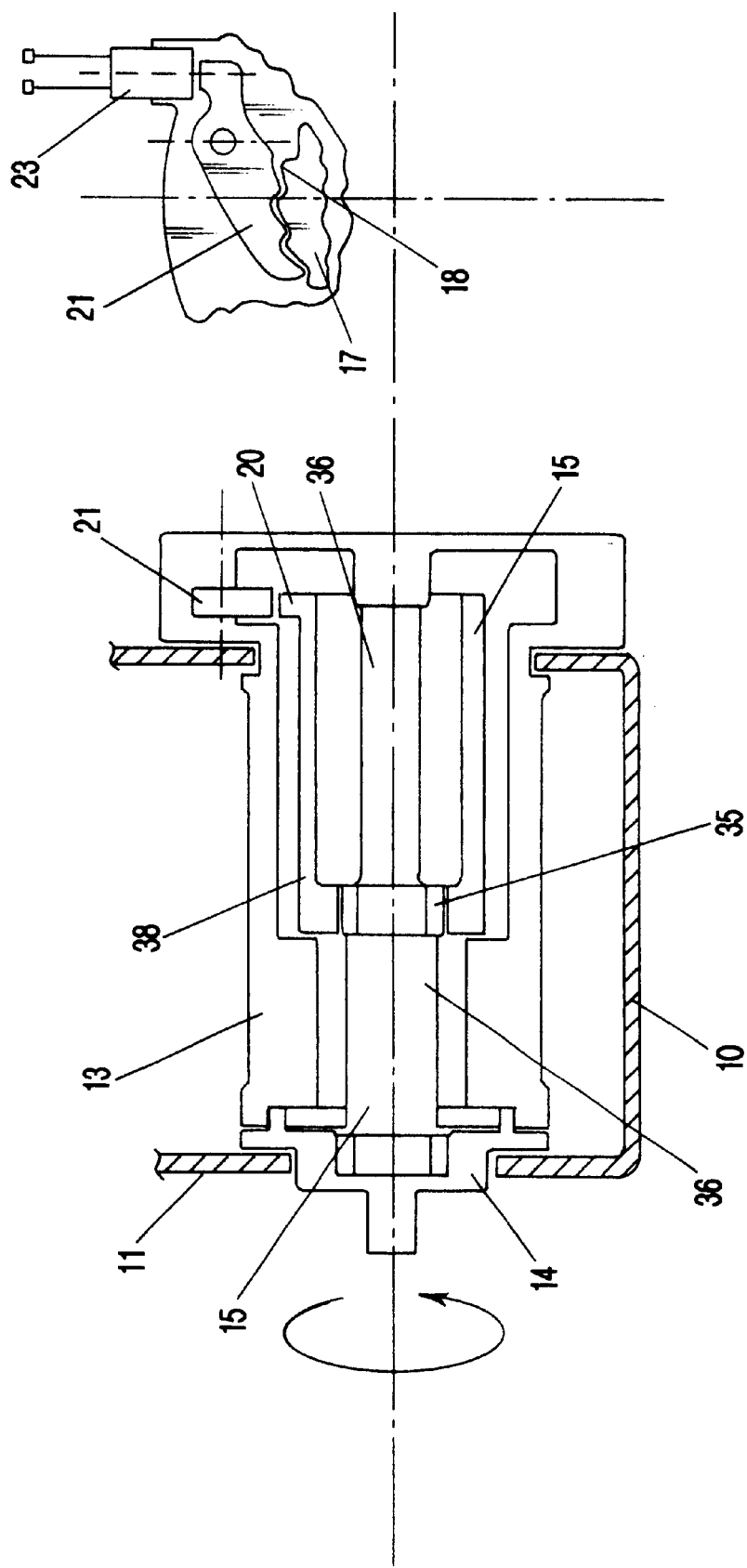
FIG. 5 a belt retractor with force limiting device in a representation according to FIG. 1 in a further embodiment with a multi-step torsion bar and switching device that is pawl-actuated.

In the embodiment represented in FIG. 5 it is suggested that the torsion bar along its length has at least two portions 36 separated by a connecting piece 35 and provided with different cross-sections. While the end of the torsion bar is directly connected to the end of the belt reeling shaft 13, the connecting piece 35 separating the portions 36 of different cross-sections is engaged by a sleeve 38 extending to the end of the belt reeling shaft 13 whereby at its end similar to the embodiment of FIGS. 1, 1a a radially projecting flange 20 with outer toothing 18 is arranged whereby at the end of the belt reeling shaft 13 a controllable coupling pawl 21 is arranged. In this embodiment, only the first portion 36 of the torsion bar 15 having the greater cross-section can be engaged by contact of the coupling pawl 21 with the belt reeling shaft 13 whereby the second portion 36 of the torsion bar 15 is bridged by the sleeve 38. When the coupling pawl 21 does not engage the sleeve 38, the belt reeling shaft 13 will load the torsion bar 15 over its entire length so that the thinner area 36 of the torsion bar 13 is twisted and a lower force level is adjusted.

Figure 6:
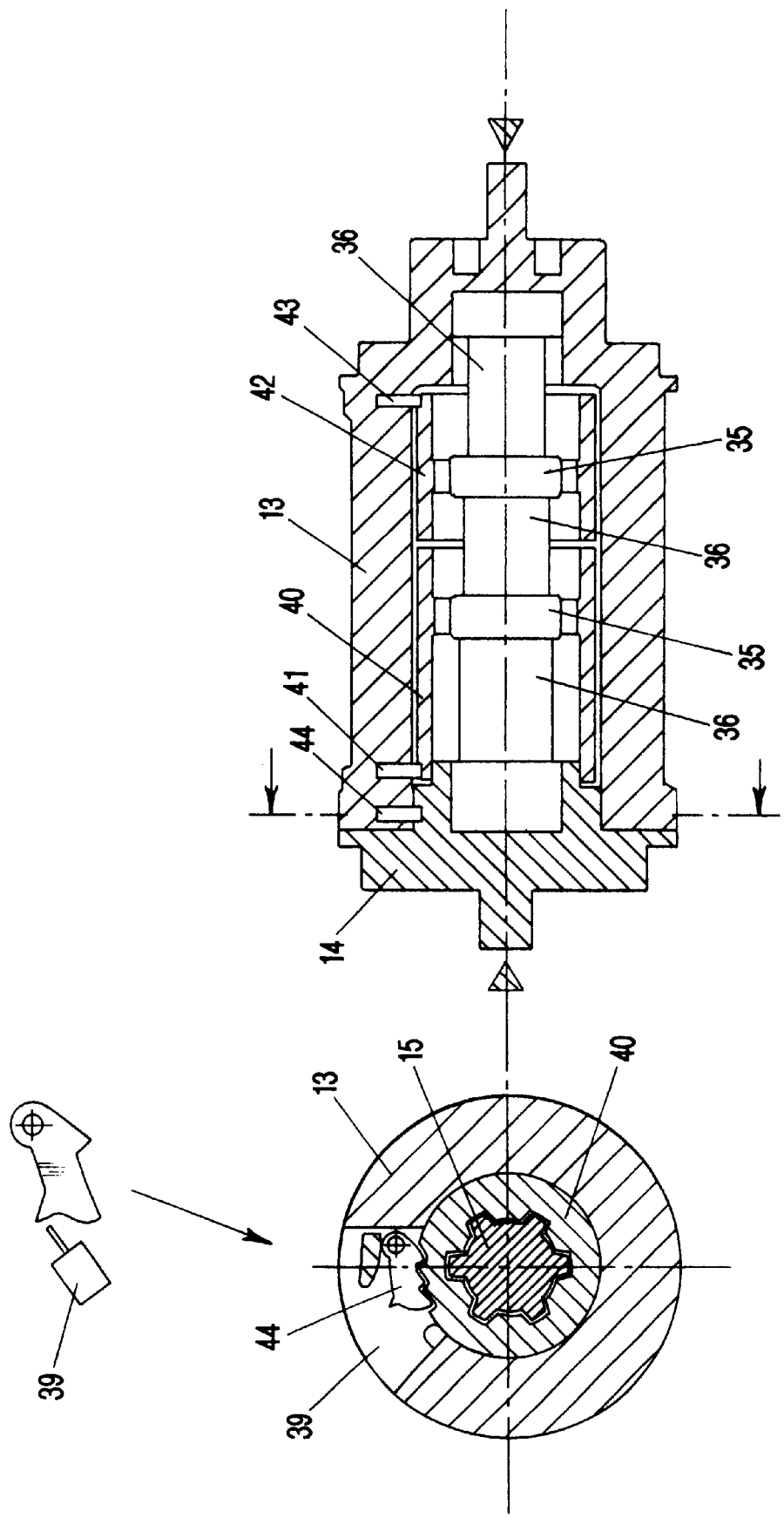
FIG. 6 the object of FIG. 5 in a further embodiment with a three-step adjustable force level.

In the embodiment represented in FIG. 6 the torsion bar 15 has three consecutive portions 36 with stepped cross-sections whereby the portions 36 are separated by two connecting pieces 35. Each connecting piece 35 has correlated therewith a sleeve 40, 42 and each sleeve 40, 42 is lockable by a corresponding pawl 41, 43 to the belt reeling shaft 13 surrounding the sleeve 40, 42. The pawls 41, 43 are locked in their initial position between the sleeve 40, 42 and the belt reeling shaft 13. When an accident occurs, they are released by an ignition pill 39 respectively arranged and coordinated in a cross-section of the belt reeling shaft. This has the advantage that the transition from one locking position into a release position is safely realized which is easier than realizing a locking action during an accident.

When during an accident, for example, both pawls 41, 43 remain locked, both connecting pieces 35 are then coupled by the corresponding sleeves 40, 42 to the belt reeling shaft 13 and the torsion bar 15 with its portion facing the left side, respectively, the profiled head is loaded which corresponds to a high force level. When during the accident a release of the pawl 41 occurs, the portion of the torsion bar 15 between the two connecting pieces 35 having a reduced cross-sectional area is thus loaded so that the force level is lowered. When subsequently also the pawl 33 is released, the belt reeling shaft, because of its connection to the torsion bar, only loads the portion of the torsion bar 15 at the right external portion with minimal cross-section which corresponds to a minimal force level.

In the represented embodiment a full load locking is additionally possible by the full load pawl 44 between the profiled head 14 and the belt reeling shaft 13, i.e., a switching off the torsion bar 15 is realized because upon locking of the full load pawl 44 a relative rotation of the belt reeling shaft 13 to the profiled head 14 supporting the locking member is not possible. When the profiled head 14 is locked by the locking member arranged thereat, the torsion bar 15 is thus turned off.

Figure 7:
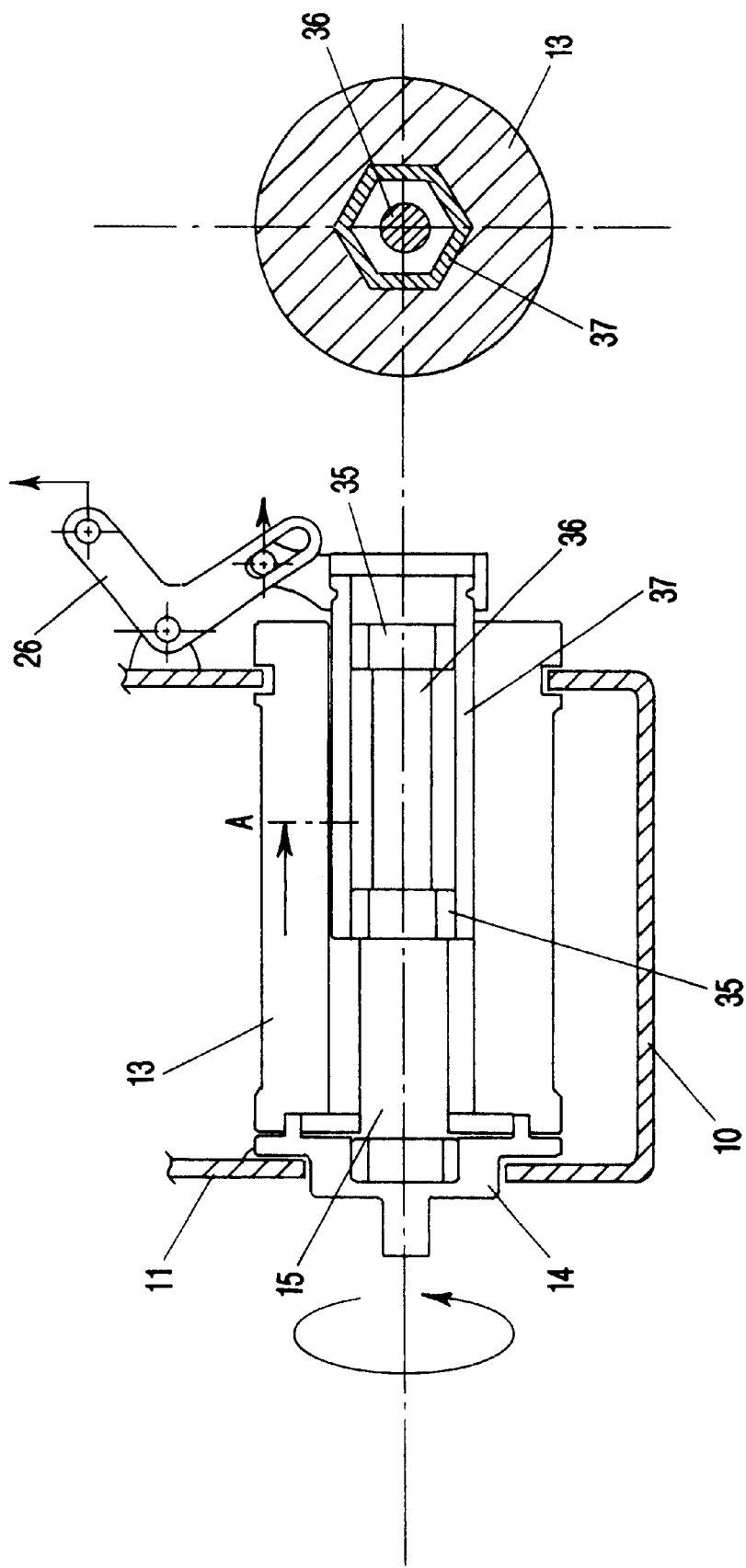
FIG. 7 a belt retractor with force limiting device in the representation according to FIG. 5 in a further embodiment with a sliding sleeve as a switching device.

In the embodiment represented in FIG. 7, a further connecting piece 35 is arranged at the end of the torsion bar 15 whereby a slide 37 is provided that engages form-lockingly the two connecting pieces 35. The slide is fixedly connected to the belt reeling shaft 13. The slide 37 is axially movable by a control lever according to the embodiment of FIG. 2. It allows activation, depending on its position, only of the first portion 36 with comparatively large cross-sectional area of the torsion bar 15 or of the entire torsion bar 15 in the position displaced to the right, including the further smaller cross-sectional area 36 by connecting it to the belt reeling shaft 13.

Inasmuch as in the embodiments an adjustment of the force level is provided with the control 23, the control lever 36, the control device 30 or the friction plate 34, these control parts can be, for example, mechanically activated by a cable pull or electrically by an electric motor or by activation of a solenoid.

Figure 8:
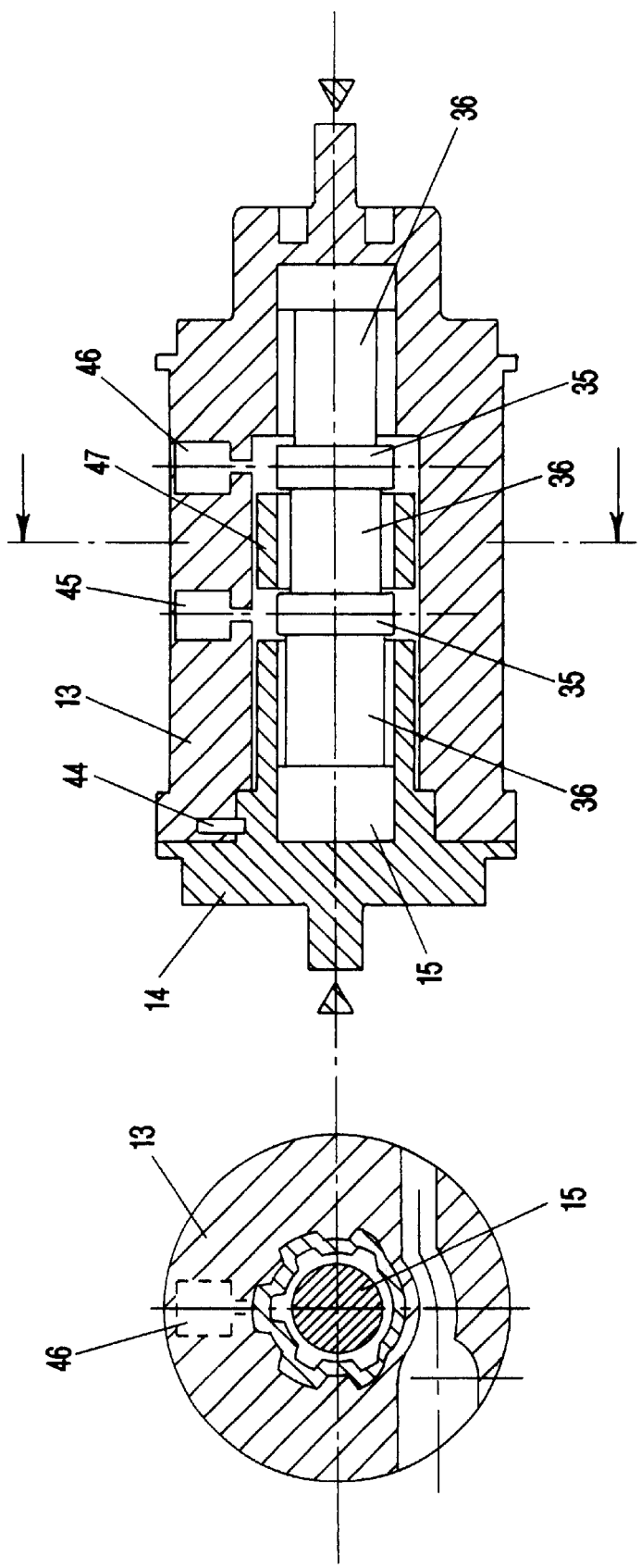
FIG. 8 the object of FIG. 7 in an embodiment with a three-step force level.
Figure 10:
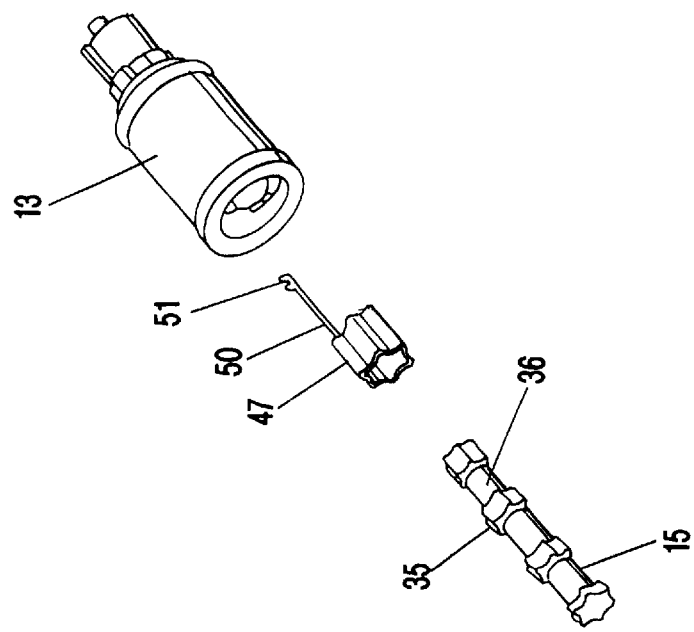
FIG. 10 the force limiting device according to FIG. 9 in an exploded view of its individual parts.

In FIG. 8 a variant of the embodiment represented in FIG. 7 is represented in which the torsion bar 15 is also designed to have a three-step force level as disclosed already in connection with the embodiment of FIG. 6 in detail. A sliding sleeve 47 is arranged such between the two connecting pieces 35 of the torsion bar 15 that the sliding sleeve can be moved in both directions along the torsion bar 15 so that it can be selectively coupled due to its connection to the belt reeling shaft to one or the other connecting piece 35 at the belt reeling shaft 13. For activation of the sliding sleeve 47 ignition pills 45, 46 are provided within the cross-section of the belt reeling shaft 13 whereby their ignition provides for movement of the sliding sleeve 47. Otherwise, the adjustment of the force level is carried out in the same manner as disclosed in FIG. 6. In the embodiment represented in FIG. 8 a full load pawl 44 for locking the profiled head 14 at the belt reeling shaft 13 is also provided.

Figure 9:
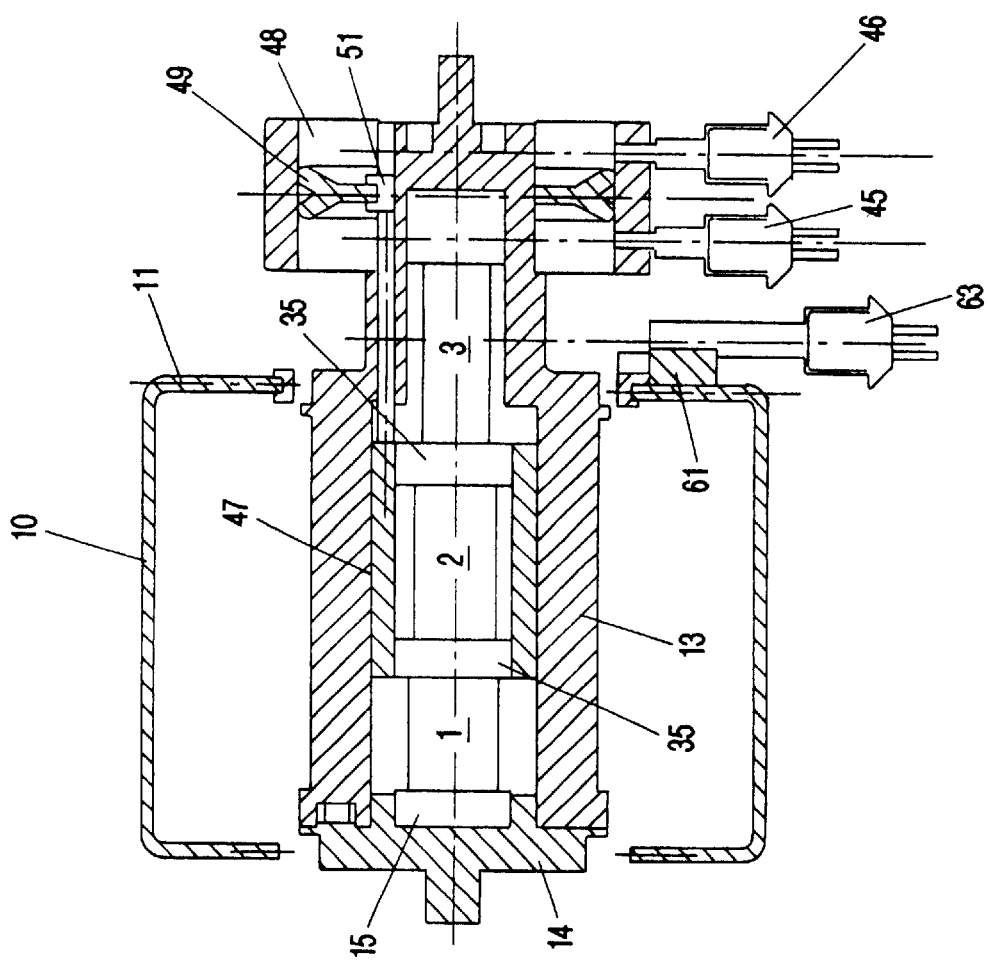
FIG. 9 the object of FIG. 8 with an alternative drive for the sliding sleeve as well as with a full load locking and abutment for the rotation of the belt reeling shaft.

The embodiment represented in FIG. 9 differs from the embodiment represented in FIG. 8 in that the drive for the sliding sleeve 47 is arranged external to the belt reeling shaft 13. Accordingly, there are no problems with respect to the arrangement of the required chambers for receiving the ignition pills within the shaft and there is also no danger of a pressure increase that is too high within the shaft. Also, no sliding contacts for the control of the ignition pills are required. At the end face of the belt retractor housing 10 a pressure chamber 48 is arranged in which in the shown embodiment with a three-step adjustment of the force level a sliding disk 49 is arranged in a central position which can be moved within the pressure chamber 48 in two directions. By a pawl 51 the sliding disk is connected to a sliding rod 50 that is itself connected to the sliding sleeve 47. The two ignition pills 45, 46 for movement of the sliding sleeve 47 are connected to the pressure chamber 48 whereby one ignition pill is provided on each side of the sliding disk 49 in order to effect the movement of the sliding disk 49 in different directions and to thus also move the sliding sleeve 47 in different directions.

Figure 12:
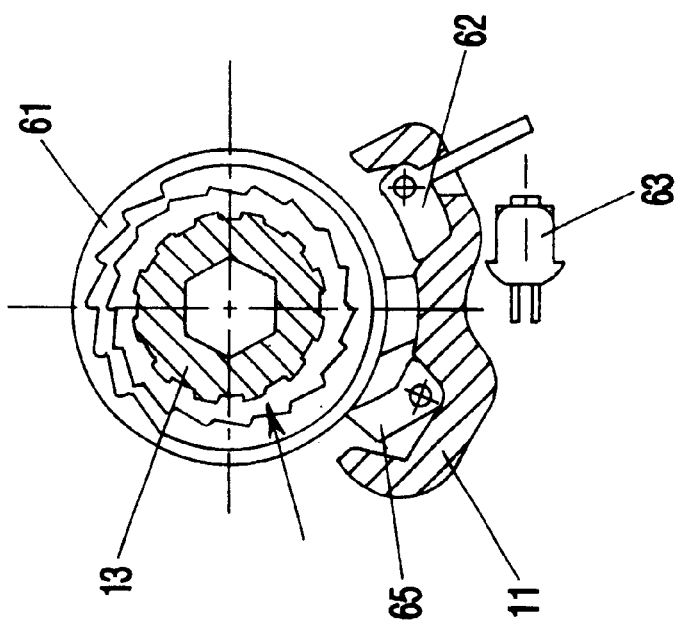
FIG. 12 the object of FIG. 11 after activation of the stop pawl by rotation of the belt reeling shaft.
Figure 11:
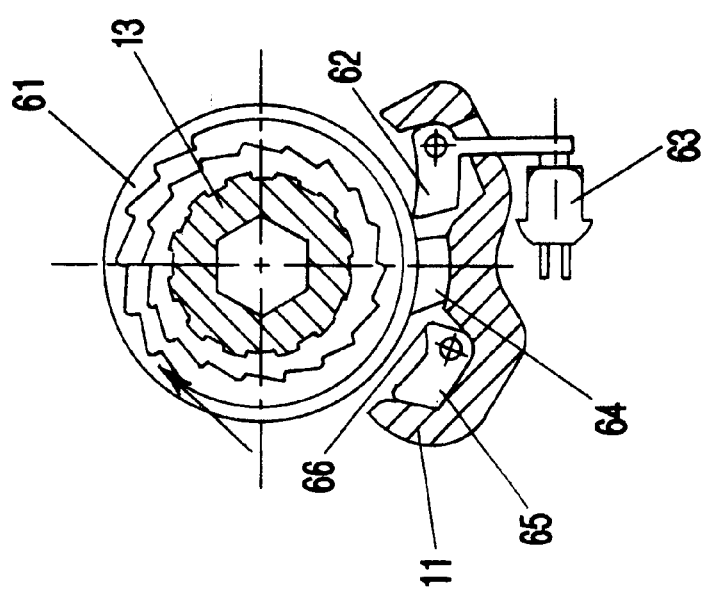
FIG. 11 the full load locking with stop according to FIG. 9 in an end view with switched-on full load locking.

As a further improvement with respect to the embodiments of FIGS. 6 and 8, in the embodiment of FIG. 9 the full load locking is realized between the belt reeling shaft 13 and the housing 10 so that the connection between the profiled head 14 and the belt reeling shaft 13 is relieved. At the outer side of the corresponding leg 11 of the housing 10 a pressure ring 61 with an inner toothing (FIGS. 11, 12) is rotatably supported such that the belt reeling shaft 13 provided with a correlated outer toothing is supported during an accident by engagement of the toothings and by the resulting blocking of the belt reeling shaft 13 due to the locking member supported at the profiled head. For switching off the torsion bar by full load locking the pressure ring 61 is lockable by a pawl 62 as is shown in FIG. 11. For this purpose, the pressure ring 61 at its outer circumference has a cam 64 which in the rotational direction of the belt reeling shaft 13 upon removal of belt is blocked by the engaged pawl 62. The pawl 62 can be pivoted by a correlated ignition pill 63 pyrotechnically out of the movement path of the cam 64 so that for switching on the torsion bar the ignition pill 63 is activated and the pawl 62 is pivoted into its release position for the pressure ring 61. In the shown embodiment a stop function is also realized for force limitation at the end of the allowable rotational movement of the belt reeling shaft, wherein at the housing additionally a stop pawl 65 is supported such that in the pivoted state it blocks the cam 64 of the pressure ring 61. For activating it, the stop pawl 65 in its release position projects with a projection 66 into the movement path of the cam 64 of the pressure ring 61 so that the cam 64, after rotation of the belt reeling shaft 13, respectively, of the pressure ring 61 coupled thereto, pivots via the stop at the projection 66 the stop pawl 65 into its stop position so that this stop position after a further, i.e., second revolution of the belt reeling shaft 13 will be activated and locks the belt reeling shaft 13. This stop thus is activated earlier than breakage of the torsion bar 15 of the force limitation would occur.

With the activated pawl 62 according to FIG. 11, the torsion bar is switched off because upon blocking of the profiled head the outer toothing of the belt reeling shaft 13 will engage the toothing of the pressure ring 61 and is thereby supported at the non-rotatable pressure ring 61 secured by the pawl 62 so that the force limitation is switched off by a further rotation of the belt reeling shaft provided by the torsion bar.

The features of the inventive device disclosed in the above description, the claims, the abstract and the drawing can be important individually or in any suitable combination with one another for realizing the invention in its various embodiments.

The specification incorporates by reference the entire disclosure of German priority documents 196 25 541.4 of Jun. 26, 1996, and 197 20 473.2 of May 15, 1997, as well as of International Application PCT/EP97/03284 of Jun. 23, 1998.

The present invention is, of course, in no way restricted to the specific disclosure of the specification and drawings, but also encompasses any modifications within the scope of the appended claims.

What is claimed is:

1. A self-locking belt retractor comprising:

a belt reeling shaft having a belt connected thereto;

a locking device, activatable in a vehicle sensitive or belt-sensitive manner for preventing belt removal from said belt reeling shaft;

said locking device comprising a locking member and a profiled head connected to said belt reeling shaft, wherein said belt reeling shaft is locked when said locking member engages said profiled head;

at least two force-limiting elements arranged in parallel or in series to one another, wherein one of said force-limiting elements is a torsion bar allowing a limited belt removal when said locking device locks said belt reeling shaft, and wherein a second one of said force-limiting elements is a torsion sleeve surrounding said torsion bar and connected to said profiled head;

a switching device for selectively engaging at least one of said force-limiting elements to thereby connect said belt reeling shaft and said profiled head, wherein said switching device comprises at least one coupling element for selectively connecting said torsion bar, said torsion sleeve, or both said torsion bar and said torsion sleeve to said belt reeling shaft, wherein said belt reeling shaft engages radially an end of said torsion bar and an end of said torsion sleeve and wherein said coupling elements are coupling pawls mounted on said belt reeling shaft, wherein a first one of said coupling bawls engages said torsion bar and wherein a second one of said coupling pawls engages said torsion sleeve;

said switching device being switched between said at least one of said force-limiting elements and said belt reeling shaft for adjusting the energy absorption of said belt retractor and adapting said belt retractor to pre-adjustable incidents of loading.

2. A belt retractor according to claim 1, wherein said coupling element is an axially movable follower disk connected in a positive-locking manner to an end of said belt reeling shaft opposite said profiled head, wherein said follower disk has follower pins, wherein said torsion bar has a first flange and said torsion sleeve has a second flange, wherein said follower disk has a coupling position in which said follower pins couple said torsion bar and said torsion sleeve to one another by penetrating said first and second flanges.

3. A belt retractor according to claim 1, wherein a second one of said force-limiting elements is comprised of at least one resistance body and a housing filled with a resistance material and arranged at an end of said belt reeling shaft opposite said locking member, wherein said at least one resistance body is revolvingly mounted within said housing, wherein said at least one resistance body acts as a switching device and is position-adjustable relative to said torsion bar.

4. A belt retractor according to claim 1, wherein a second one of said force-limiting elements is comprised of a paddle wheel and a housing filled with a resistance material and mounted at an end of said belt reeling shaft opposite said locking member, wherein said paddle wheel is rotatingly mounted in said housing, said second force-limiting element further comprising a pressure plate axially displaceably arranged in said housing for adjusting a density of said resistance material.

5. A belt retractor according to claim 1, wherein said torsion bar is comprised of different portions each having a different cross-section, whereby at least one of said portions is a second one of said force-limiting elements and wherein said portions are separated from one another by a connecting piece, wherein said switching device comprises at least one coupling element and wherein said portions are respectively connectable to said belt reeling shaft by said at least one coupling element arranged between said belt reeling shaft and said connecting piece.

6. A belt retractor according to claim 1, further comprising a pressure ring rotatably supported in a housing of said belt retractor for switching off said torsion bar by engaging said belt reeling shaft, wherein said pressure ring is secured in a full load position by a pawl activated by a pyrotechnical ignition pill.

7. A self-locking belt retractor comprising:
a belt reeling shaft having a belt connected thereto;
a locking device, activatable in a vehicle sensitive or belt-sensitive manner for preventing belt removal from said belt reeling shaft;
said locking device comprising a locking member and a profiled head connected to said belt reeling shaft, wherein said belt reeling shaft is locked when said locking member engages said profiled head;
at least two force-limiting elements arranged in parallel or in series to one another, wherein one of said force-limiting elements is a torsion bar allowing a limited belt removal when said locking device locks said belt reeling shaft, and wherein a second one of said force-limiting elements is a torsion sleeve surrounding said torsion bar and connected to said profiled head;
a switching device for selectively engaging at least one of said force-limiting elements to thereby connect said belt reeling shaft and said profiled head, wherein said switching device comprising at least one coupling element for selectively connecting said torsion bar, said torsion sleeve, or both said torsion bar and said torsion sleeve to said belt reeling shaft, wherein said coupling element is an axially movable follower disk connected in a positive-locking manner to an end of said belt reeling shaft opposite said profiled head, wherein said follower disk has follower pins, wherein said torsion bar has a first flange and said torsion sleeve has a second flange, wherein said follower disk has a coupling position in which said follower pins couple said torsion bar and said torsion sleeve to one another by penetrating said first and second flanges;
said switching device being switched between said at least one of said force-limiting elements and said belt reeling shaft for adjusting the energy absorption of said belt retractor and adapting said belt retractor to pre-adjustable incidents of loading.

8. A self-locking belt retractor comprising:
a belt reeling shaft having a belt connected thereto;
a locking device, activatable in a vehicle sensitive or belt-sensitive manner for preventing belt removal from said belt reeling shaft;
said locking device comprising a locking member and a profiled head connected to said belt reeling shaft, wherein said belt reeling shaft is locked when said locking member engages said profiled head;
at least two force-limiting elements arranged in parallel or in series to one another, wherein one of said force-limiting elements is a torsion bar allowing a limited belt removal when said locking device locks said belt reeling shaft, wherein a second one of said force-limiting elements is comprised of at least one resistance body and a housing filled with a resistance material and arranged at an end of said belt reeling shaft opposite said locking member, wherein said at least one resistance body is revolvingly mounted within said housing, wherein said at least one resistance body acts as a switching device and is positioned-adjustable relative to said torsion bar;
wherein said switching device for selectively engaging at least one of said force-limiting elements to thereby connect said belt reeling shaft and said profiled head;
said switching device being switched between said at least one of said force-limiting elements and said belt reeling shaft for adjusting the energy absorption of said belt retractor and adapting said belt retractor to pre-adjustable incidents of loading.

9. A self-locking belt retractor comprising:
a belt reeling shaft having a belt connected thereto;
a locking device, activatable in a vehicle sensitive or belt-sensitive manner for preventing belt removal from said belt reeling shaft;
said locking device comprising a locking member and a profiled head connected to said belt reeling shaft, wherein said belt reeling shaft is locked when said locking member engages said profiled head;
at least two force-limiting elements arranged in parallel or in series to one another, wherein one of said force-limiting elements is a torsion bar allowing a limited belt removal when said locking device locks said belt reeling shaft, wherein a second one of said force-limiting elements is comprised of a paddle wheel and a housing filled with a resistance material and mounted at an end of said belt reeling shaft opposite said locking member, wherein said paddle wheel is rotatingly mounted in said housing, said second force-limiting element further comprising a pressure plate axially displaceably arranged in said housing for adjusting a density of said resistance material;
a switching device for selectively engaging at least one of said force-limiting elements to thereby connect said belt reeling shaft and said profiled head;
said switching device being switched between said at least one of said force-limiting elements and said belt reeling shaft for adjusting the energy of absorption of said belt retractor and adapting said belt retractor to pre-adjustable incidents of loading.

10. A self-locking belt retractor comprising:
a belt reeling shaft having a belt connected thereto;
a locking device, activatable in a vehicle sensitive or belt-sensitive manner for preventing belt removal from said belt reeling shaft;
said locking device comprising a locking member and a profiled head connected to said belt reeling shaft, wherein said belt reeling shaft is locked when said locking member engages said profiled head;
at least two force-limiting elements arranged in parallel or in series to one another, wherein one of said force-limiting elements is a torsion bar allowing a limited belt removal when said locking device locks said belt reeling shaft, wherein said torsion bar is comprised of different portions each having a different cross-section, whereby at least one of said portions is a second one of said force-limiting elements and wherein said portions are separated from one another by a connecting piece;
a switching device for selectively engaging at least one of said force-limiting elements to thereby connect said belt reeling shaft and said profiled head, wherein said switching device comprises at least one coupling element and wherein said portions are respectively connectable to said belt reeling shaft by said at least one coupling element arranged between said belt reeling shaft and said connecting piece;

said switching device being switched between said at least one of said force-limiting elements and said belt reeling shaft for adjusting the energy absorption of said belt retractor and adapting said belt retractor to pre-adjustable incidents of loading.

11. A belt retractor according to claim 10, wherein one end of said torsion bar is connected to said belt reeling shaft, wherein said at least one coupling element is a coupling pawl coupling said connecting piece to said belt reeling shaft, wherein said coupling pawl is supported on the belt reeling shaft.

12. A belt retractor according to claim 11, further comprising a sleeve engaging in a positive-locking manner said connecting piece and surrounding said torsion bar, wherein said coupling pawl is designed for securing said sleeve.

13. A belt retractor according to claim 12, wherein said torsion bar has three of said portions separated by two of said connecting pieces to provide a three-step adjustable energy absorption, wherein said three portions have different cross-sections and wherein each one of said connecting pieces has a separate one of said sleeves and each one of said sleeves has one of said coupling pawls correlated therewith.

14. A belt retractor according to claim 11, further comprising a pyrotechnical pill for activating said coupling pawl, wherein said pyrotechnical pill is positioned within said belt reeling shaft.

15. A belt retractor according to claim 10, wherein said coupling element is a sliding sleeve coupled to said belt reeling shaft so as to rotate with said belt reeling shaft, but axially movably arranged on said belt reeling shaft, wherein said coupling element positive-lockingly engages said connecting pieces.

16. A belt retractor according to claim 15, wherein said sliding sleeve is slidable by a pyrotechnical ignition pill arranged within said belt reeling shaft.

17. A belt retractor according to claim 15, further comprising:

a pressure chamber, having a sliding disk slidably arranged therein, connected to an end face of said belt retractor;

a sliding rod, having a pawl engaging said sliding disk, connected to said sliding sleeve;

at least one pressure pill connected externally to said pressure chamber for generating and introducing pressure gas into said pressure chamber upon activation for actuating said sliding sleeve.

18. A belt retractor according to claim 17, wherein, for adjusting a three-step adjustable energy absorption of said torsion bar, said torsion bar has three of said portions having differently stepped cross-sections and separated by two of said connecting pieces, wherein said sliding sleeve is displaceable between said two connecting pieces and is selectively coupled to one of said connecting pieces, wherein two of said pressure pills are provided for acting on opposite sides of said sliding disk.

19. A self-locking belt retractor comprising:

a belt reeling shaft having a belt connected thereto;

a locking device, activatable in a vehicle sensitive or belt-sensitive manner for preventing belt reeling shaft;

said locking device comprising a locking member and a profiled head connected to said belt reeling shaft, wherein said belt reeling shaft is locked when said locking member engages said profiled head;

at least two force-limiting elements arranged in parallel or in series to one another, wherein one of said force-limiting elements is a torsion bar allowing a limited belt removal when said locking device locks said belt reeling shaft;

a switching device for selectively engaging at least one of said force-limiting elements to thereby connect said belt reeling shaft and said profiled head;

said switching device being switched between said at least one of said force-limiting limiting elements and said belt reeling shaft for adjusting the energy absorption of said belt retractor and adapting said belt retractor to pre-adjustable incidents of loading; and a pressure ring rotatably supported in a housing of said belt retractor for switching off said torsion bar by engaging said belt reeling shaft, wherein said pressure ring is secured in a full load position by a pawl activated by a pyrotechnical ignition pill.

20. A belt retractor according to claim 19, further comprising a stop pawl correlated with said pressure ring, wherein said stop pawl is pivoted by said pressure ring, rotating when said torsion bar is switched on, into a stop position, wherein said stop pawl upon further rotation of said pressure ring provides a fixed stop for said pressure ring.

* * * * *